United States Patent
Spector et al.

(10) Patent No.: US 11,088,996 B1
(45) Date of Patent: Aug. 10, 2021

(54) SECURE NETWORK PROTOCOL AND TRANSIT SYSTEM TO PROTECT COMMUNICATIONS DELIVERABILITY AND ATTRIBUTION

(71) Applicant: SecureCo, Inc., New York, NY (US)

(72) Inventors: Lawrence S. Spector, Stamford, CT (US); Eric B. Sackowitz, Norwalk, CT (US); Chad Robinson, Lafayette, CO (US); Alexey Potakhov, South Setauket, NY (US)

(73) Assignee: SecureCo, Inc., New York, NY (US)

( * ) Notice: Subject to any disclaimer, the term of this patent is extended or adjusted under 35 U.S.C. 154(b) by 0 days.

(21) Appl. No.: 17/172,965

(22) Filed: Feb. 10, 2021

(51) Int. Cl.
*H04L 29/06* (2006.01)
*H04W 12/30* (2021.01)

(52) U.S. Cl.
CPC ...... *H04L 63/0421* (2013.01); *H04L 63/0272* (2013.01); *H04L 63/0478* (2013.01); *H04W 12/35* (2021.01)

(58) Field of Classification Search
CPC ............. H04L 63/0272; H04L 63/0421; H04L 63/0478; H04L 63/0407; H04L 63/0414; H04L 63/0464; H04W 12/35
See application file for complete search history.

(56) References Cited

U.S. PATENT DOCUMENTS

| | | | |
|---|---|---|---|
| 7,865,715 B2* | 1/2011 | Xu | H04L 63/0407 713/153 |
| 7,921,211 B2* | 4/2011 | Larson | H04L 29/12066 |
| 9,191,371 B2* | 11/2015 | Chang | H04L 63/18 |
| 9,680,798 B2* | 6/2017 | Wittenschlaeger | H04L 63/0442 |
| 9,729,438 B2* | 8/2017 | Broz | H04L 63/0471 |
| 10,999,402 B2* | 5/2021 | Shribman | H04L 65/4084 |
| 2006/0258332 A1* | 11/2006 | Jennings | H04L 63/1408 455/411 |
| 2012/0054843 A1* | 3/2012 | Horman | H04L 63/0823 726/7 |
| 2015/0172168 A1* | 6/2015 | Picconi | H04L 45/64 709/241 |
| 2017/0012942 A1* | 1/2017 | Wittenschlaeger | H04L 63/0442 |
| 2019/0132292 A1* | 5/2019 | Reimer | H04L 63/0407 |
| 2020/0274849 A1* | 8/2020 | Smith | H04L 63/0272 |

\* cited by examiner

*Primary Examiner* — Linglan E Edwards
(74) *Attorney, Agent, or Firm* — David H. Judson

(57) ABSTRACT

A network protocol and transit system that together provide data tunneling designed for anonymous and hidden delivery. The approach protects communications deliverability and attribution for users on any device and in any location, irrespective of the underlying operating environment. The solution provides for a fully "cloaked network" comprising zero-trust nodes, an onion routing-based bi-directional protocol with modular multi-layered encryption, evasive multi-pathing that leverages randomized ephemeral virtual circuit generation, and virtual rendezvous for person-to-person communications. The approach may be implemented "as-a-service," in a hybrid/bridged network, on-premises, or otherwise.

18 Claims, 10 Drawing Sheets

SECURE NETWORK PROTOCOL AND TRANSIT SYSTEM TO PROTECT COMMUNICATIONS DELIVERABILITY AND ATTRIBUTION

BACKGROUND

Technical Field

This application relates generally to securing communications networks.

Brief Description of the Related Art

There are many well-known techniques and technologies that purport to secure communications over computer networks.

For example, a virtual private network (VPN) extends a private network across a public network and enables users to send and receive data across shared or public networks as if their computing devices were directly connected to the private network. Applications running across a VPN may therefore benefit from the functionality, security, and management of the private network. Encryption is commonly used in a VPN connection. VPNs typically implement secure network protocols, such as Internet Protocol Security (IPsec), which authenticates and encrypts data packets to provide secure encrypted communication between two computers over an Internet Protocol (IP)-based network. IPsec includes protocols for establishing mutual authentication between agents at the beginning of a session and negotiation of cryptographic keys to use during the session. IPsec can protect data flows between a pair of hosts (host-to-host), between a pair of security gateways (network-to-network), or between a security gateway and a host (network-to-host).

Another point-to-point solution is end-to-end encryption (E2EE) is a system of communication where only the communicating users can read the messages that are being transmitted over the network. This type of solution prevents potential eavesdroppers, including even the service provider itself, from being able to access the cryptographic keys needed to decrypt the conversation.

Tor is an open-source solution for enabling anonymous communication by directing Internet traffic through a free, worldwide, volunteer overlay network comprising relays to conceal a user's location and usage from anyone conducting network surveillance or traffic analysis. Tor implements onion routing, a technique for anonymous communication over a computer network. In an onion network, messages are encapsulated in layers of encryption, analogous to layers of an onion. The encrypted data is transmitted through a series of network nodes called onion routers, each of which "peels" away a single layer, uncovering the data's next destination. When the final layer is decrypted, the message arrives at its destination. The sender remains anonymous because each intermediary knows only the location of the immediately preceding and following nodes. A conventional Tor implementation has a known set of ingress and egress points.

While the above-described approaches do provide useful security and privacy guarantees in many operating scenarios, the over-reliance on encryption and point-to-point solutions mask various risks, namely, identity and geolocation exposure, the discoverability and disruption of data-in-transit, and the ability of malicious entities to exploit users and their local access points.

There remains a need to provide solutions that protect communications deliverability and attribution on any device and in any location, especially in untrusted networking environments.

BRIEF SUMMARY

This disclosure provides for a network protocol and transit system that together provide data tunneling designed for anonymous and hidden delivery. The approach protects communications deliverability and attribution for users on any device and in any location, irrespective of the underlying operating environment. As will be seen, the approach herein provides for a fully "cloaked network" comprising zero-trust nodes, an onion routing-based bi-directional protocol with modular multi-layered encryption, evasive multi-pathing that leverages randomized ephemeral virtual circuit generation, and virtual rendezvous for person-to-person communications. The approach may be implemented "as-a-service," in a hybrid/bridged network, on-premises, or otherwise.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

The techniques herein provide for a private secure protocol (PSP) and networking solution that provides a real-time decentralized messaging layer for distributed applications. The PSP nomenclature is not intended to be limiting. As will be seen, PSP provides applications with anonymity, privacy and security features including, without limitation, end-to-end encryption, user-to-user authentication, and metadata termination. The solution provides a way for applications and users to communicate with one another anonymously, and where sensitive user metadata is disassociated in communication sessions. Examples of types of metadata that are protected are user identities and IP addresses. Generally, privacy in PSP is achieved by disassociating the link between source and destination IP addresses and making it harder to characterize the data. As will be seen, this prevents any network node from associating a user's IP address with the user's identification. This anonymity is used by default for one-to-one messaging, and session negotiation and creation. In a representative embodiment, this privacy is implemented using an anonymous layer built on top of onion routing. In a network that uses onion routing, messages are encapsulated in layers of encryption, analogous to layers of an onion.

Figure 1:
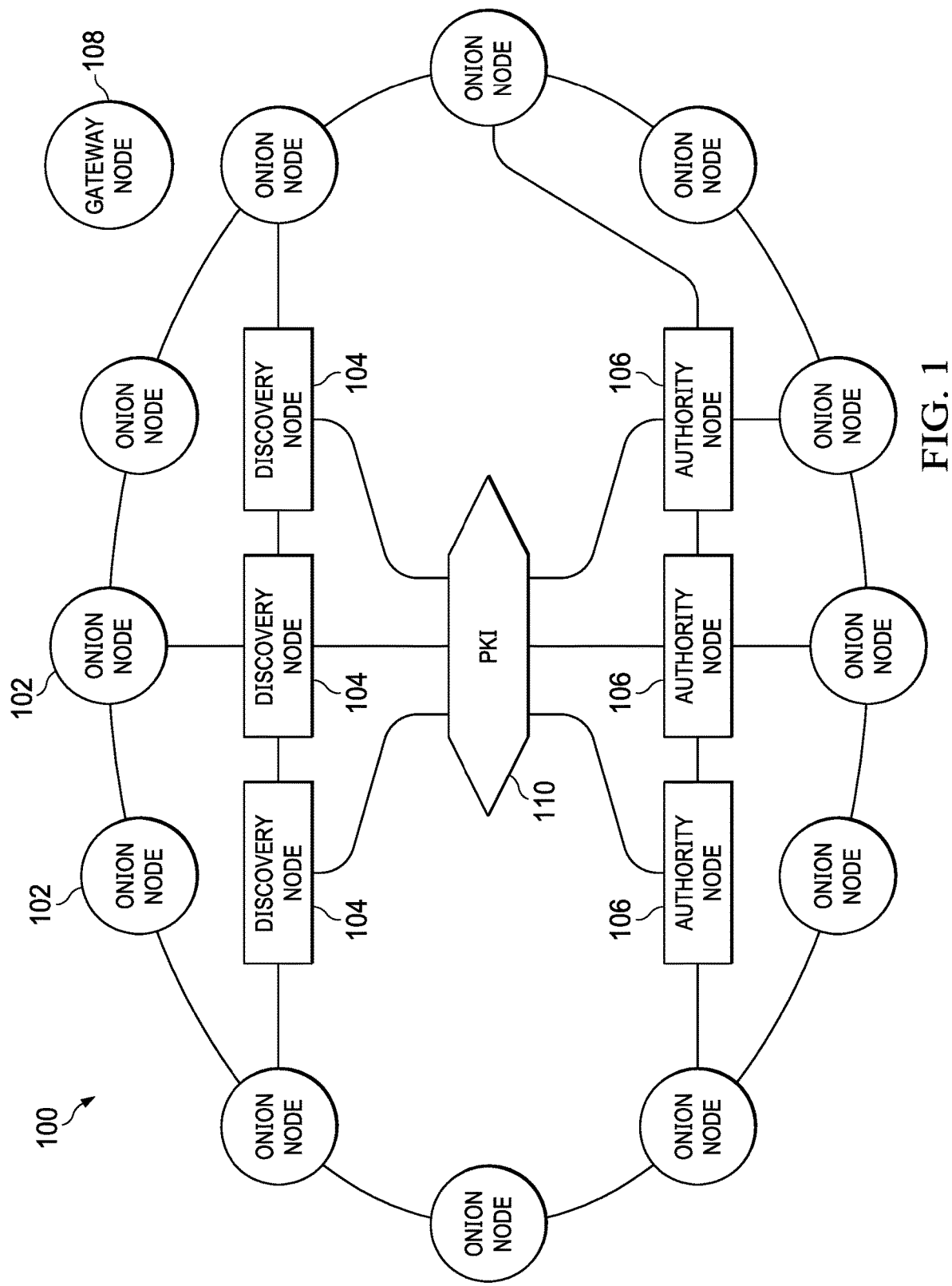
FIG. 1 depicts a representative mesh network of nodes according to this disclosure.

The PSP and network solution typically is implemented as a network of "nodes" that are associated together in a mesh. As used herein, typically a "node" is a computing entity comprising software executing on computing hardware. These nodes comprise an overlay network (or a set of nested overlays); an overlay network is a computer network built on top of another network, e.g., the publicly-routable Internet, a private network, a hybrid network, or the like. Referring now to FIG. 1 in particular, a representative mesh (or "PSP") network 100 of various nodes is depicted. In a representative embodiment, PSP nodes are organized into a loosely-connected mesh network. Typically, each of the nodes is connected to a subset of the other nodes at any point in time. Nodes are designed to maintain internode connections when required and drop unused connections and re-establish them when required again. As will be described, typically some PSP nodes are publicly-accessible, e.g., via one or public network interfaces, and some PSP nodes serve as internal nodes or are only used as interim or final hops in the system. Typically, nodes have various distinct roles, such as general available (onion) nodes 102, discovery nodes 104, authority nodes 106, and gateway traffic nodes 108. Although PSP nodes typically play different roles in the PSP network, some nodes can be elected to play more than just a single role. As also depicted in FIG. 1, the mesh network may integrate with a blockchain layer 110 as a Public Key Infrastructure (PKI) to store, authenticate, validate both client and node cryptographic identifiers, and to support other administration, management and operational entities.

In general, an onion node 102 is used as an entry or interim node for creating and extending onion routes, and to announce and manage online points of presence for clients of the system. These nodes facilitate onion routing, which as implemented herein provides a unique binary, bi-directional protocol with modular multi-layered encryption. Each discovery node 104 provides a node digest for all the clients wishing to operate on the network. Discovery nodes are used for getting listings of other nodes. In particular, the node digest is agreed-upon via a consensus algorithm (e.g., raft) that determines a correct state and listing of all nodes on the network, and typically only discovery nodes have a vote in the consensus. In a preferred embodiment, the discovery nodes implement a discovery/lookup service via the consensus algorithm, thereby allowing the listing to be retrieved by making such a request upon any discovery node in the system.

The discovery nodes 104 communicate through the secure onion network (provided by onion nodes 102) to find peers (as will be described below), as well as to store and retrieve values (e.g., a peer's "presence record" as will be described below). Each discovery node is identified by a node identifier, which preferably is generated from an asymmetric cryptographic identity key of a host PSP node to provide security from attacks from adversarial nodes on the network. The discovery node contains a local datastore for storing key-value pairs, as well as a routing table that is used to locate peers on the network. Preferably, all nodes (regardless of their role) report their status periodically to all known discovery nodes they can reach. As noted above, discovery nodes do a voting and build consensus periodically to form a new list of nodes, and this list is signed with one or more discovery keys. This periodically-generated list of nodes typically contains a full list of all public nodes, node flags, node addresses (for entry nodes, if available), and geographic locations. In this system, nodes bootstrap the discovery using publicly-available discovery information, and they preferably reseed it during the session by performing queries to a random distinct node from a most recent discovery digest. From a security perspective, discovery nodes 104 that participate in the discovery process are acting as privileged nodes; preferably, a final list of discovery nodes is established by electing a number of trusted nodes, and this full list is then made available publicly.

As will be described below, onion nodes 102 in PSP provide the ability for clients (e.g., endpoints, or peers) to communicate securely and privately by allowing onion nodes 102 to publish presence information for clients requesting that functionality. That presence information can then be requested by any other client on the network, allowing the onion nodes to then form a bridge (using one or more so-called "virtual" circuits) between clients to facilitate secure and private communication between parties without compromising the location of any party on the network.

Referring back to FIG. 1, some of the nodes preferably are elected as authority nodes 106, wherein an authority node acts as a bridge to a PKI layer 110. An authority node 106 typically performs as an authorization source for other nodes and clients of the system. Gateway traffic nodes 108 facilitate on-premises (e.g., customer) deployments where first or last mile requirements dictate implementation directly with trusted/DMZ black side (dirty Internet) of router ports. Gateway nodes are useful in operating environments such as classified and confidential site-to-site, or remote site applications. Additionally, a gateway node 108 is useful as an exit node from the PSP network, e.g., to facilitate consumer/business browsing traffic for services that may exist outside the closed and cloaked PSP environment. Although not depicted, other node types may be provided. These include oracle nodes, which act as network validators collecting and confirming node bandwidth utilization, commercial nodes, which act as application-specific nodes providing dynamic business logic support for applications, bridge nodes, which act as regular onion nodes but that are not listed on a publicly-available node digest; bridge nodes act a system entry points with respect to locations that might otherwise be geographically-blocked.

In order for clients to be able to announce their presence information for other users, the system provides a distributed data storage of such presence information available from any discovery node. Preferably, the distributed data storage comprises a Distributed Hash Table (DHT). In one embodiment, DHT is an implementation of Kademlia modeled after IPFS (a distributed filesystem) with S/Kademlia modifications to mitigate vulnerabilities against known network-based attacks. In general, and as will be seen, PSP clients depend on DHT to facilitate the ability of onion nodes 102 to provide private and secure communication between parties (peers) using the PSP network. DHT is responsible for recording and making information available in a fast, secure, stable, and scalable manner to enable such secure communication, all without sacrificing privacy.

To prevent unauthorized modifications of data on the DHT layer every record on a table preferably is signed by the record owner and co-signed by the node originally publishing the record. The record owner typically is defined as the originator of the record, which can be a client, node or group identity. Both nodes and consuming clients only accept data that they are able to validate, confirm the ownership of and can verify the signature. Preferably, every record on the DHT is assigned with an expiration time must be periodically renewed to continue to be listed. Once a record expires, it gets automatically wiped by all nodes.

Preferably, a default core set of discovery nodes is provided to a client that uses the service, and a client may require some minimum number of signatures from known discovery nodes to be present (i.e., to have its presence information recorded) on a directory listing that will then be shared across the discovery nodes. The signatures are used so that the listing may be trusted as a valid, and also for use in building routes.

Preferably, any participating (node, privileged node or end user application) identity is represented by a namespace, application namespace and public key identifying the client entity on a PKI store (part of layer 110). Every identity can be validated against the system PKI store using a set of one or more authority nodes 106. This results in building a temporary access certificate, which allows a client to operate on a system signing announcements and introduction requests using that identity.

The following section provides further details regarding client registration and presence announcement on the network. As noted above, preferably client applications use onion routing to hide the user IP address from various parts of the system. To build the route (sometimes referred to herein as a virtual circuit), the client decides on all the nodes on the path it is going to use, and then telescopically extends the path from one node to another, node-by-node, preferably implementing an asymmetric encryption algorithm scheme to build a session key for each new hop over an encrypted TLS (Transport Layer Security) pipe (from the client to the entrance node, and from node to node for all interim nodes). Preferably, every node on a network limits the send rate so that the onion routing layer itself is not used for passing real-time data. Rather, preferably it is used only for the presence/signaling layer and direct user-to-user private messaging.

Figure 2:
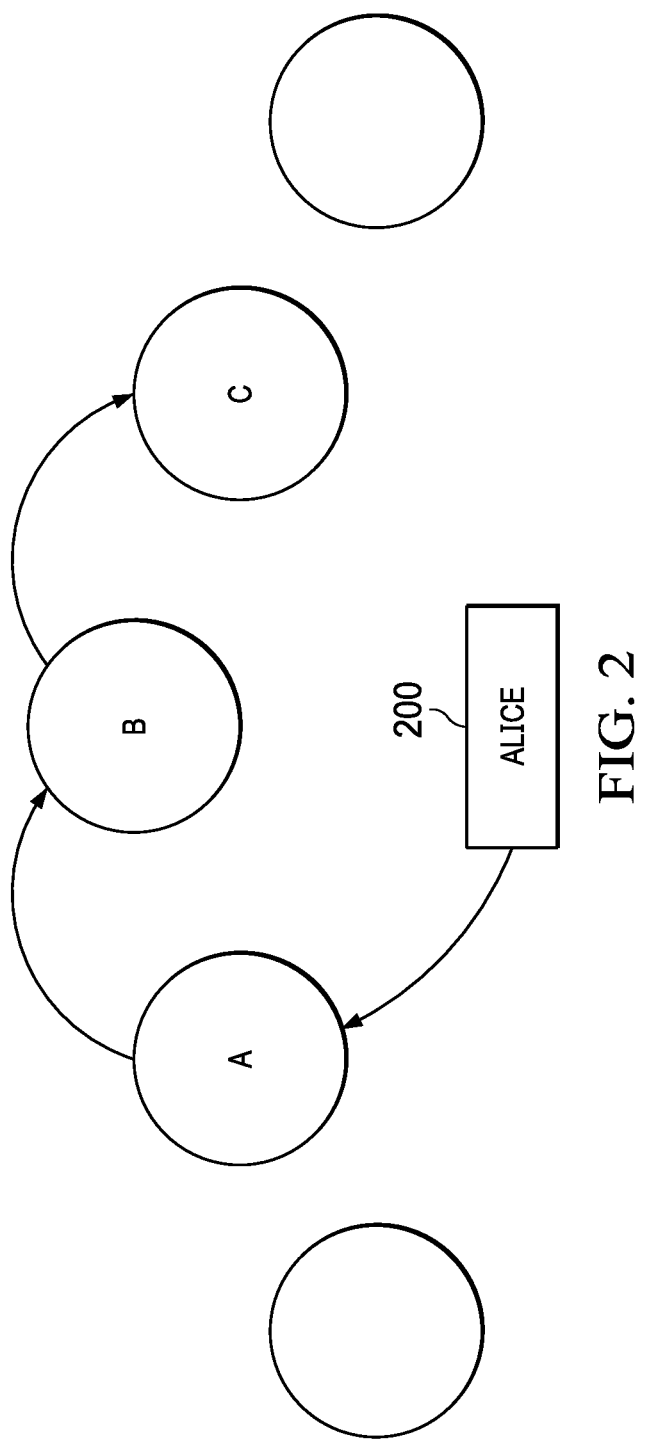
FIG. 2 depicts an example of how a client registers and announces its presence on the network.

Presence is announced anonymously. In particular, for a client to establish its presence on the system without revealing network identity, preferably the approach herein detaches the user presence node from the client's real entrance point. To this end, the client preferably registers several points of contact for itself, and these points are sometimes referred to as presence nodes. In a preferred scheme, the client discovers three (3) independent nodes on the network. The client then chooses which node becomes the client's entrance node, which node becomes the client's presence node, and then the client proceeds to build an onion route towards the destination. This operation is depicted in FIG. 2. In this example, client Alice 200 chooses node A as an entrance node and node C as her presence node. Initially, Alice connects to the node A anonymously, using the handshake key from node A. Preferably, this link is then used to establish a Diffie-Hellman (D-H) key exchange using an asymmetric encryption algorithm, thereby creating a session key K between Alice and node A. After a secure connection is established in this manner, Alice then requests that node A extend the connection on her behalf, reaching node B. Alice then requests node A extend to further reach node C, where in this example Alice reveals her identity, preferably signing a registration message with her access certificate. Alice then announces herself (using the DHT storage mechanism previously described) using node C as the presence point for her across the entire network of nodes. Preferably, this announcement is co-signed by the node C and assigned some expiration time. Alice then can renew the presence registration by sending keep-alive events over that channel periodically. For fault tolerance, Alicen may register multiple such presence endpoints, and clients discovering her should be able to choose which entries are most recent, and be able to contact one or several of them. In a variant embodiment, and where full anonymity is not required, a client is able to establish the presence on a first hop, and without necessarily building a three (3) hop route as has been described. This variant, however, does not hide the relation between client IP address and the client's public identity.

Figure 3:
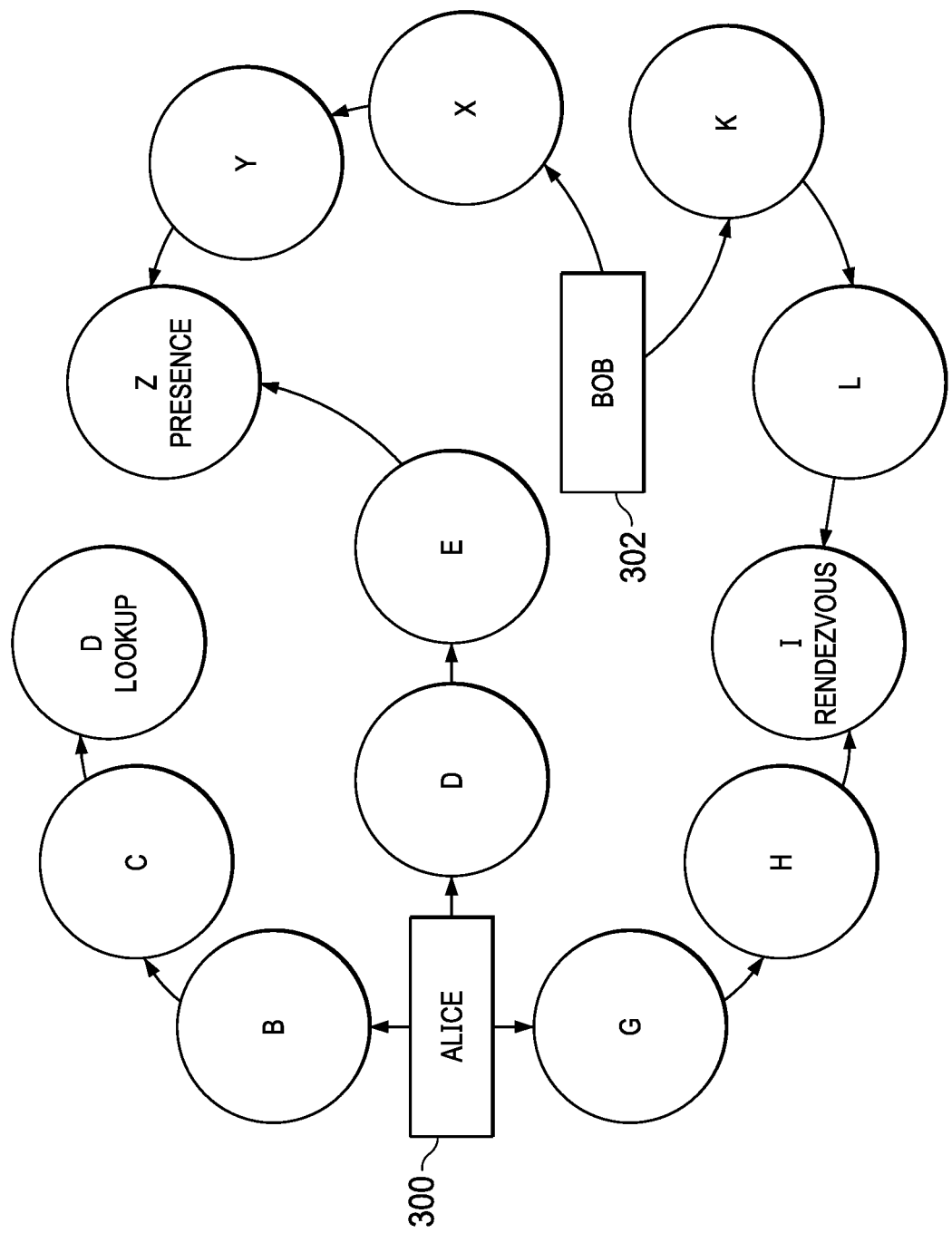
FIG. 3 depicts an example of an overall client lookup and private exchange between two (2) users according to this disclosure.

With reference now to FIG. 3, a high level depiction is provided of a client lookup and private communication exchange between clients Alice 300 and Bob 302. In this example, it is assumed that Bob established his presence point at node Z and his presence is recorded in the DHT. The following describes the process Alice uses to discover and reach Bob in a secure manner. This mechanism prevents revealing to any observer (or other nodes participating in session) that these users are communicating with one another. To this end, Alice first chooses preferably three (3) additional nodes, in this example scenario nodes B, C and D. Alice then uses the created circuit (sometimes referred to as a virtual circuit) to perform a "user lookup" request in an anonymous manner, receiving in return a list of Bob's presence points. After obtaining the list, Alice then builds a similar route G, H and I, using I as the destination node. Once this circuit is built, Alice establishes it (node I) as a rendezvous point, delivering half-sequence initialization for the new session with Bob. After establishing the rendezvous point, Alice learns Bob's presence node Z from the DHT; Alice then extends the new route D, E towards one of Bob's presence nodes Z, thereby forming new circuit D, E and Z. Thereafter, Alice creates an introduction request containing her identity and her rendezvous point I. She then encrypts that information, preferably using Bob's announcement key. Finally, Alice delivers this message (the encrypted information) through the route so only Bob is able to unwrap the message without revealing to node Z that the original sender is Alice. If Bob then accepts the request, he creates a new circuit K, L and I, ending up at rendezvous node I. Bob then completes a second half of the secure connection in a similar manner, resulting in the creation of a new secure channel between Alice and Bob that is only known to the two users involved.

The secure channel is a binary, bi-directional channel that carries the full network payload for the communications between Alice and Bob thereafter.

Due to the anonymous nature of these communication channels, a node itself is unable to validate the authenticity of the incoming connection request. Therefore, each communication channel has to be approved by the receiving client application. Preferably, this is done by limiting the amount of creation requests being processed by a single node at any given moment of time (or over some configurable time period), and allowing the node the ability to request cancellation of any request. Such cancellation results in immediate termination of a route built from the other client to the presence node. Preferably, the PSP network is also able to specify a rate limit for every communication channel created, thereby allowing the presence node to throttle the data volume and to specify a hard channel limit, capping the numbers of channels created to the single presence of the client. In this scenario, the client should be notified when the cap is reached so that the user thereof has the opportunity to register more presence endpoints if needed.

Figure 4:
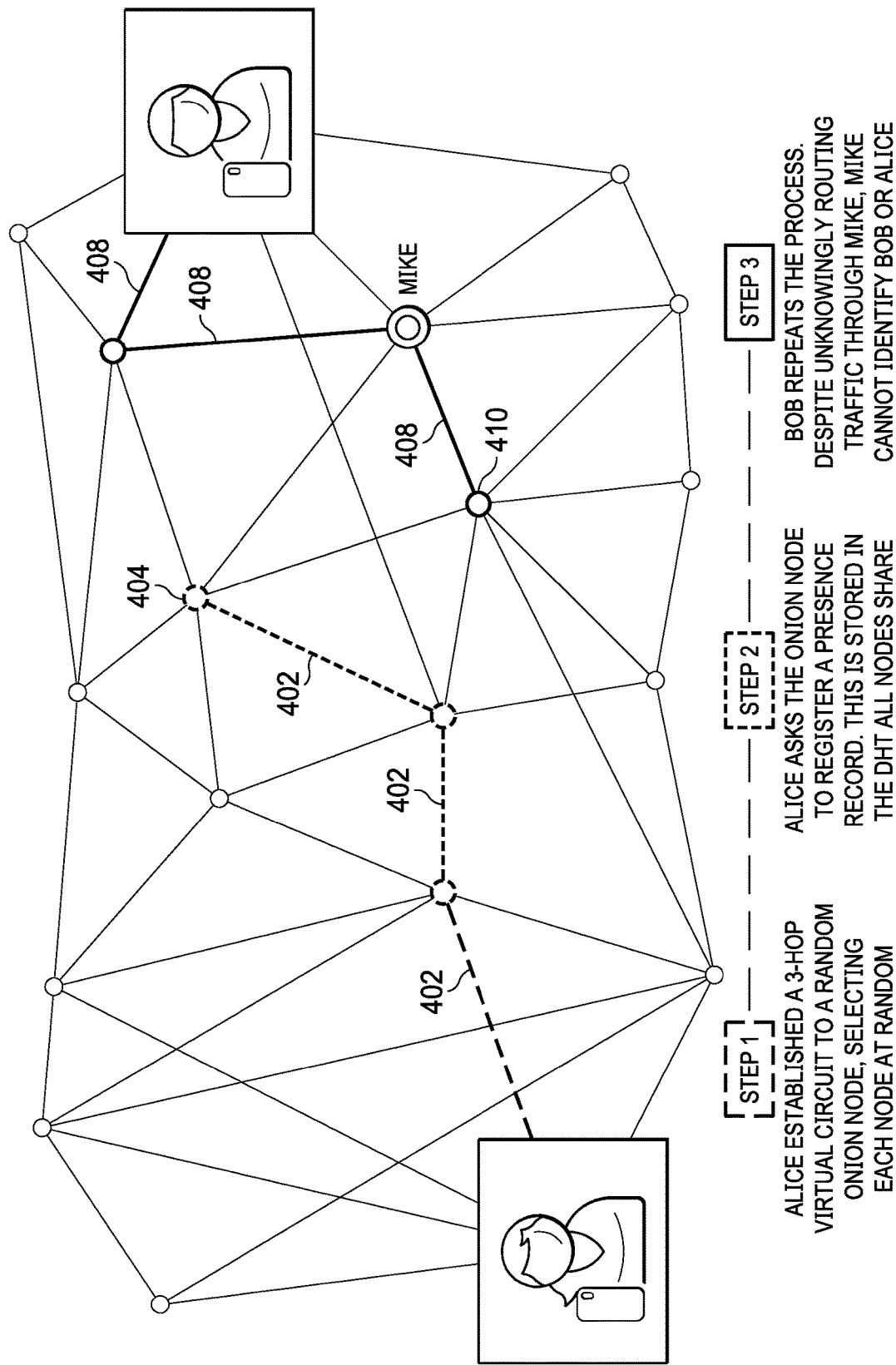
FIG. 4 depicts how the clients of FIG. 3 announce their presence anonymously.
Figure 5:
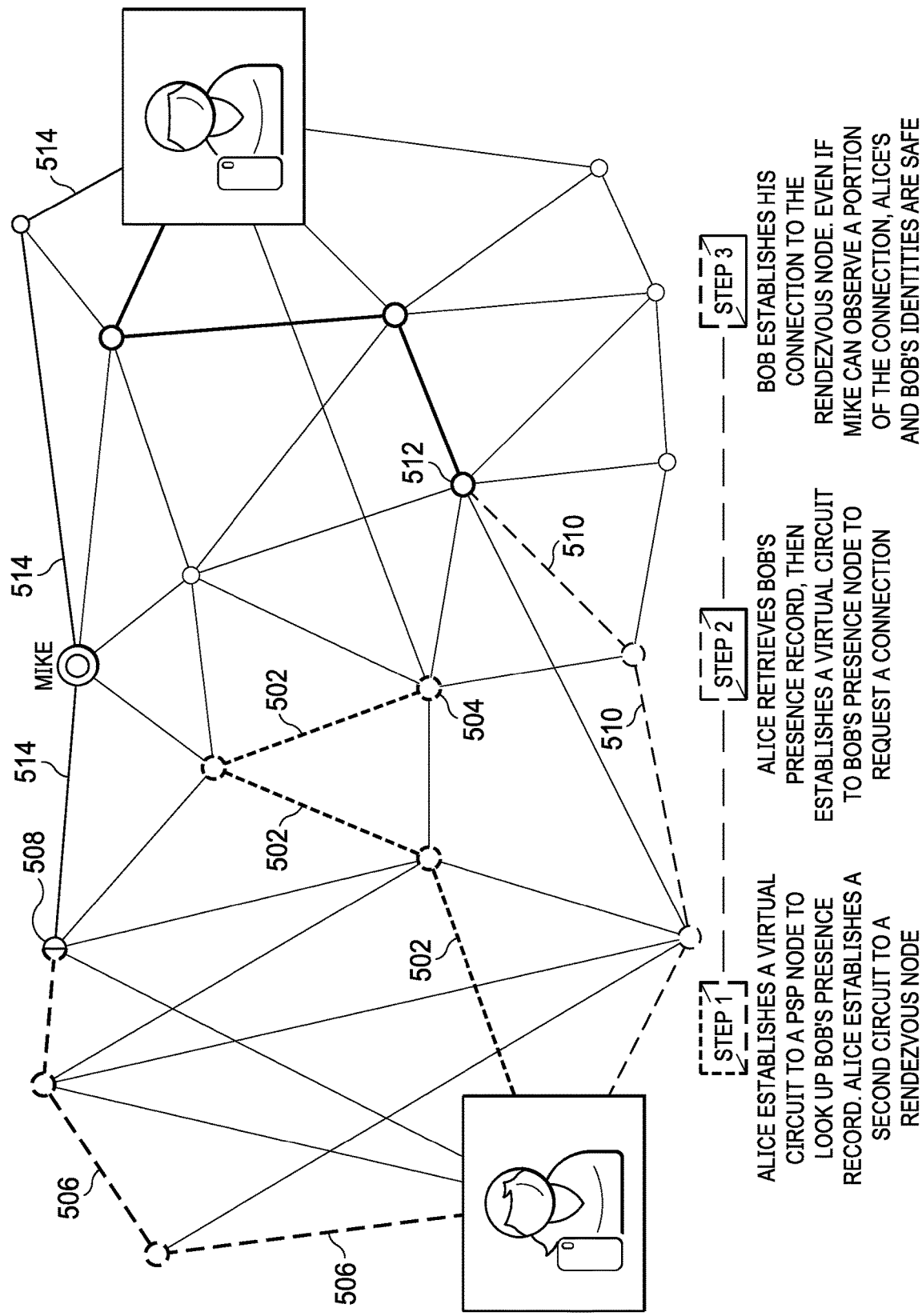
FIG. 5 depicts how the clients of FIG. 3 each associate to a rendezvous node through which their secure channel operates.

FIGS. 4-5 depict the above described example in additional detail. In particular, and as shown in FIG. 4, each party is depicted announcing their presence anonymously. For example, Alice connects to a discovery node to obtain a list of all nodes on the network. As was described, Alice establishes a virtual circuit 402 to create a presence record and without revealing her source network identity. Preferably, the virtual circuit 402 is created as a 3-hop virtual circuit to a random onion node 404, and with Alice selecting each node at random. She then asks the onion node 404 to register a presence record, which record is stored in the DHT that all onion nodes share. Bob repeats this process. In particular, Bob also obtains a node list via the discovery service. Bob also establishes a virtual circuit 408 to create a presence record, e.g., at node 410. As shown, and despite unknowingly routing traffic through Mike, Mike cannot identify either Bob or Alice. In other words, Mike cannot coerce Alice or Bob to pass traffic through Mike's node. Mike also cannot even determine which stage in Bob's connection process his node is participating.

FIG. 5 then depicts the two clients establishing the secure channel between them. In particular, Alice builds a virtual circuit 502 to a PSP node 504 to perform a lookup of Bob's presence announcement records. Concurrently, she also builds another virtual circuit 506 to a rendezvous node 508. Alice retrieves Bob's presence record, and then establishes another virtual circuit 510, this time to Bob's presence node 512, to request a connection (which if accepted will be built via the rendezvous node 508). If Bob then accepts the request, he builds a virtual circuit 514 to the rendezvous node 508. In this manner, Alice and Bob now have a new secure channel between and known only to them. No observer or node (e.g., Mike) participating in the session knows Alice and Bob are communicating. Alice builds The presence record tells Alice where to find Bob's presence node, at which she can then go to request a connection (via the rendezvous node 508).

Thus, and as has been depicted, when clients (such as Alice or Bob) talk to the discovery service (the discovery nodes), a list of all the nodes in the network is typically obtained. Obtaining a full list is not required for presence (e.g., Alice posting a presence record) or lookups (Bob going to look it up). As the example scenario (FIGS. 4-5) makes clear, the approach herein enables the clients seeking to establish the secure channel to generate and use multiple virtual circuits. These circuits are built by clients picking random nodes, and thus the virtual circuits can also be considered to be randomized and indeed ephemeral in nature. This provides for multi-pathing that is highly resistant to discovery even by the nodes that participate in the session itself.

Figure 6:
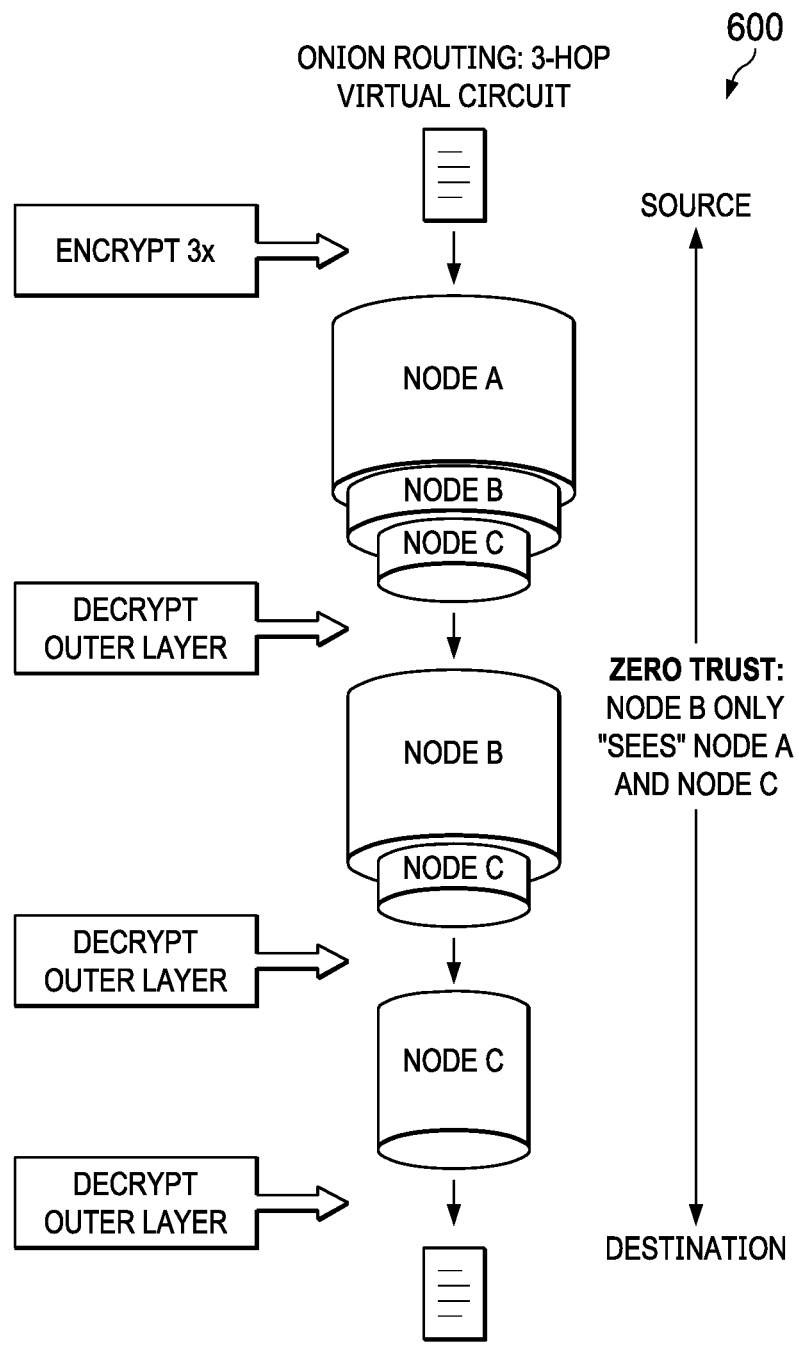
FIG. 6 depicts how a represent three (3) hop virtual circuit is built.

FIG. 6 depicts the preferred three (3) hop virtual circuit generation and use. This is the notion of the client building a virtual circuit, preferably using three or more nodes picked at random. As depicted, it is assumed that the client (not shown) located at the source desires to send a message 600 to a destination via the three (3) hop circuit comprising nodes A, B and C. Although three (3) hops are shown, this is not a limitation, as additional hops (nodes). For a typical three (3) virtual circuit as shown, however, three (3) layers of encryption are applied to the message. Node A can only decrypt the outer layer, leaving two (2) layers of encryption. Node B can only decrypt the outer layer, still leaving one encrypted layer. Only node C can remove that encryption. As a result, a zero trust arrangement is established across the circuit as a whole, meaning that node B only sees node A and node C, but node B cannot access the message contents. The innermost payload is effectively end-to-end encrypted. Zero trust nodes mitigate network-born attacks, thereby minimizing exposure to co-opted network nodes. As virtual circuits built in the manner typically rely on random nodes, the approach herein provides for evasive multi-pathing, as has been described.

Figure 7:
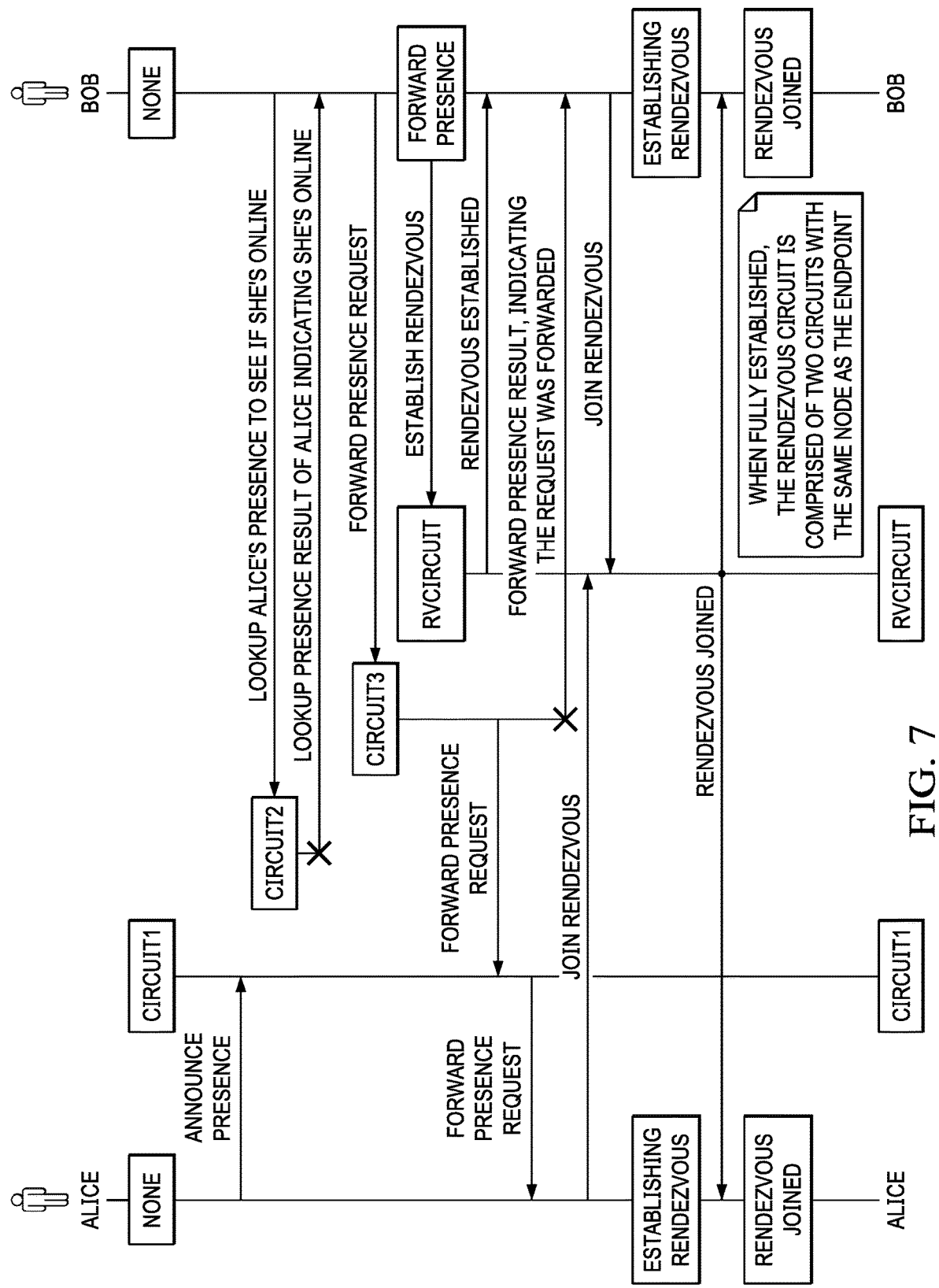
FIG. 7 depicts a UML sequence diagram corresponding to the operations depicted in FIGS. 4-5

FIG. 7 depicts a representative UML-based sequence diagram corresponding to the technique by which the clients announce their presence anonymously and then use DHT and virtual circuit building to connect to one other via a secure channel built through a rendezvous node.

Figure 8:
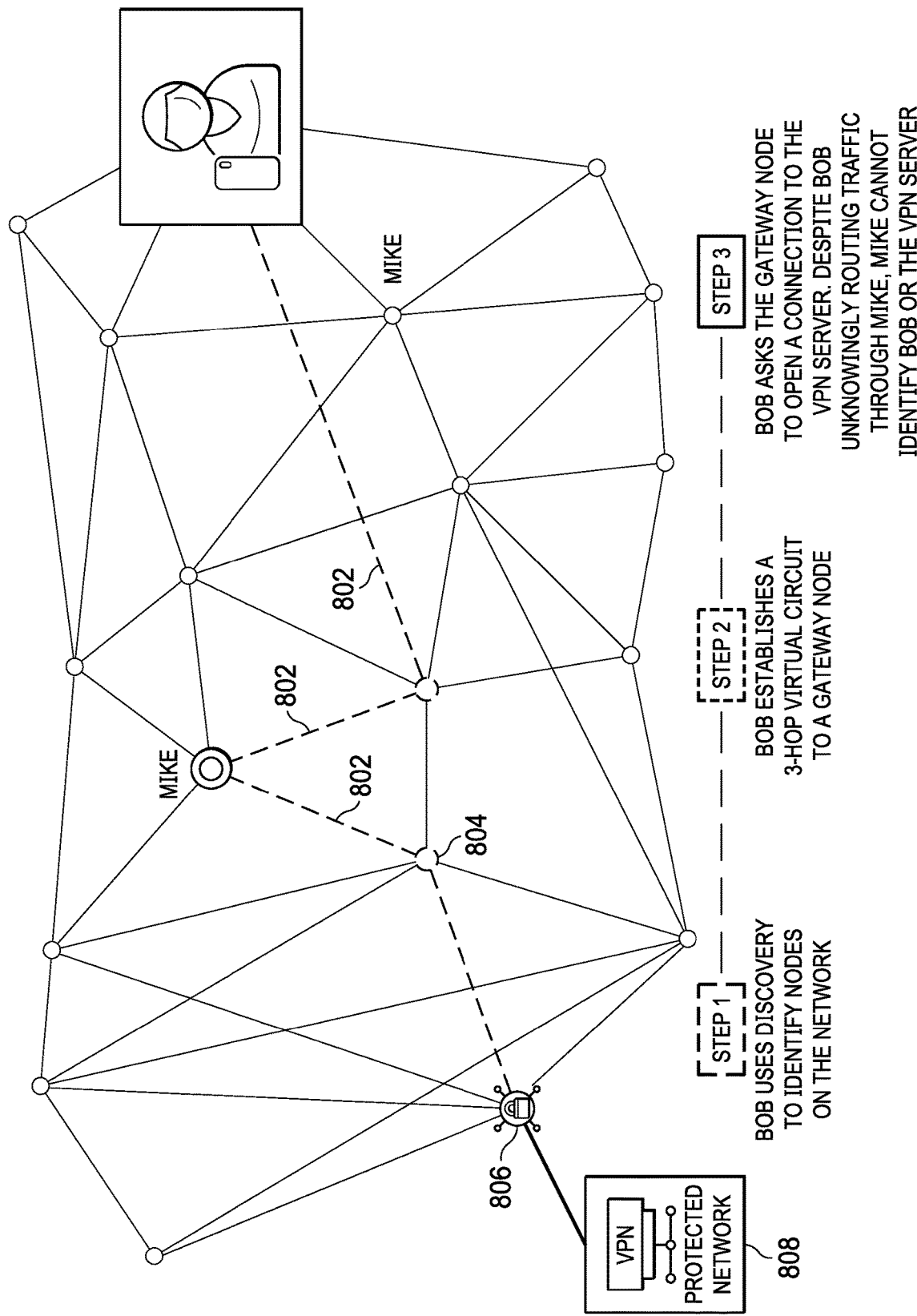
FIG. 8 depicts a variant embodiment showing client Bob connecting to a corporate network via a gateway node according to another aspect of this disclosure.
Figure 9:
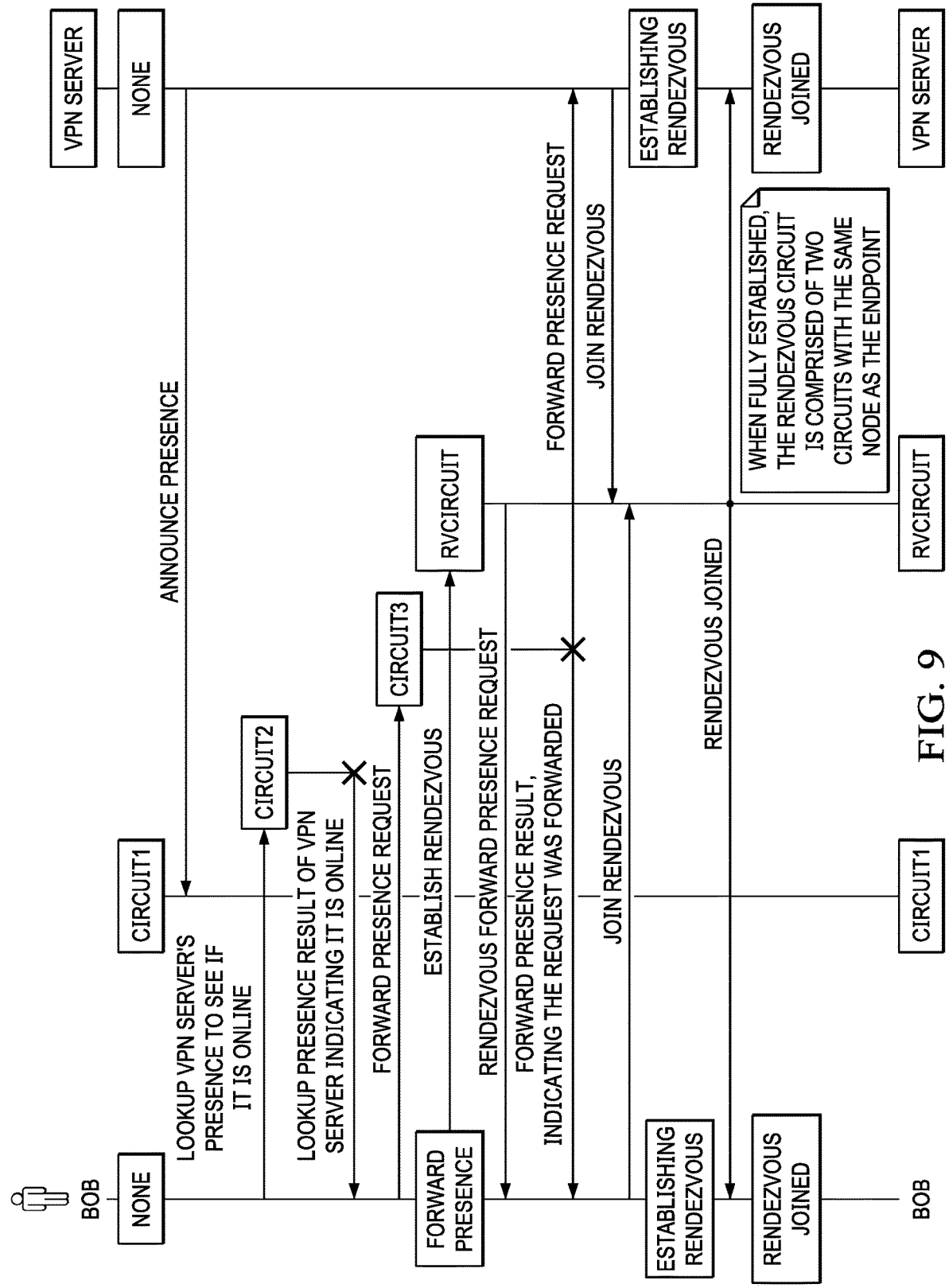
FIG. 9 depicts a UML sequence diagram corresponding to the gateway-based embodiment shown in FIG. 8.

The techniques herein are not limited to client-to-client scenarios, such as the Alice-to-Bob secure communication scenario. As noted above, a common node type may be a "gateway," and FIG. 8 depicts another communication scenario. In this example, client Bob desires to connect to a protected network, such as a corporate network accessed through a VPN 800 or the like. In this case, Bob desires to anonymously connect to the VPN. As seen in FIG. 8, and using the techniques previously described, Bob connects to a discovery node to obtain a list of all nodes on the network. Bob then establishes a three (3) hop virtual circuit 802 to a gateway node 804. Bob then asks the gateway node 804 to establish a connection to the VPN 800. The gateway node 804 checks Bob's authorizations. If Bob is authorized to access the protected network through the VPN, the gateway node 804 then establishes a VPN connection 806 to the protected network. As also shown, malicious node operator Mike cannot coerce Bob to send traffic through his node. Even if traffic does pass through Mike, Mike cannot determine the true start or end of the circuit, nor the requestor involved. FIG. 9 depicts a full UML sequence diagram for this operating scenario. As a skilled person will appreciate, the approach depicted in FIGS. 8-9 provide for a VPN-like solution that not only protects content, but also identity. The approach in this example anonymizes and randomizes connections, providing evasive and ephemeral multi-pathing, to prevent snoopers from even knowing that the user is using a VPN.

The protected network may be a corporate network or, more generally, a secure remote network.

Thus, according to the above-described technique, specialized nodes (as described above) are used to facilitate the creation of the binary, bi-directional and ephemeral communication channel. No exit or relay nodes are required to be used. The PSP presence mechanism preferably uses a DHT lookup to a known presence area (a presence record) that is hashed with an identity of the user to which the DHT entry belongs. Additionally, preferably the node that entered the record into the hash table is also entered into the record. When the identity is looked up, the user identity is used to know where to look up the record. Thus, typically only the record of a known PKI entity can be looked up. As also previously described, in PSP preferably presence announcements are published periodically. When a client does a lookup of a user announcement from DHT, it receives a list of records. This serves several purposes; it allows multiple announcements (renewal) during a given period, and it allows messaging to be received on multiple devices that are looked into the same account simultaneously. And as also previously described, in PSP a client uses a lookup presence request to get an announcement (a presence record), but then reaches the desired other user via another node specified in the announcement record. As also noted, a user (client) typically performs a registration operation via an authority node. The authority node returns a certificate that allows the user to thereafter use the network; in particular, the user performs his or her announcement. Another user wanting to connect would then perform a lookup presence, obtain the announcement record, and then do a forward presence request.

More generally, the approach herein may provide secure communication channels for various different types of operating scenarios including, without limitation, person-to-site (remote access), person-to-person (mobile-based), site-to-site and cross-domain, ITN and tactical edge, IoT-based, and others.

Figure 10:
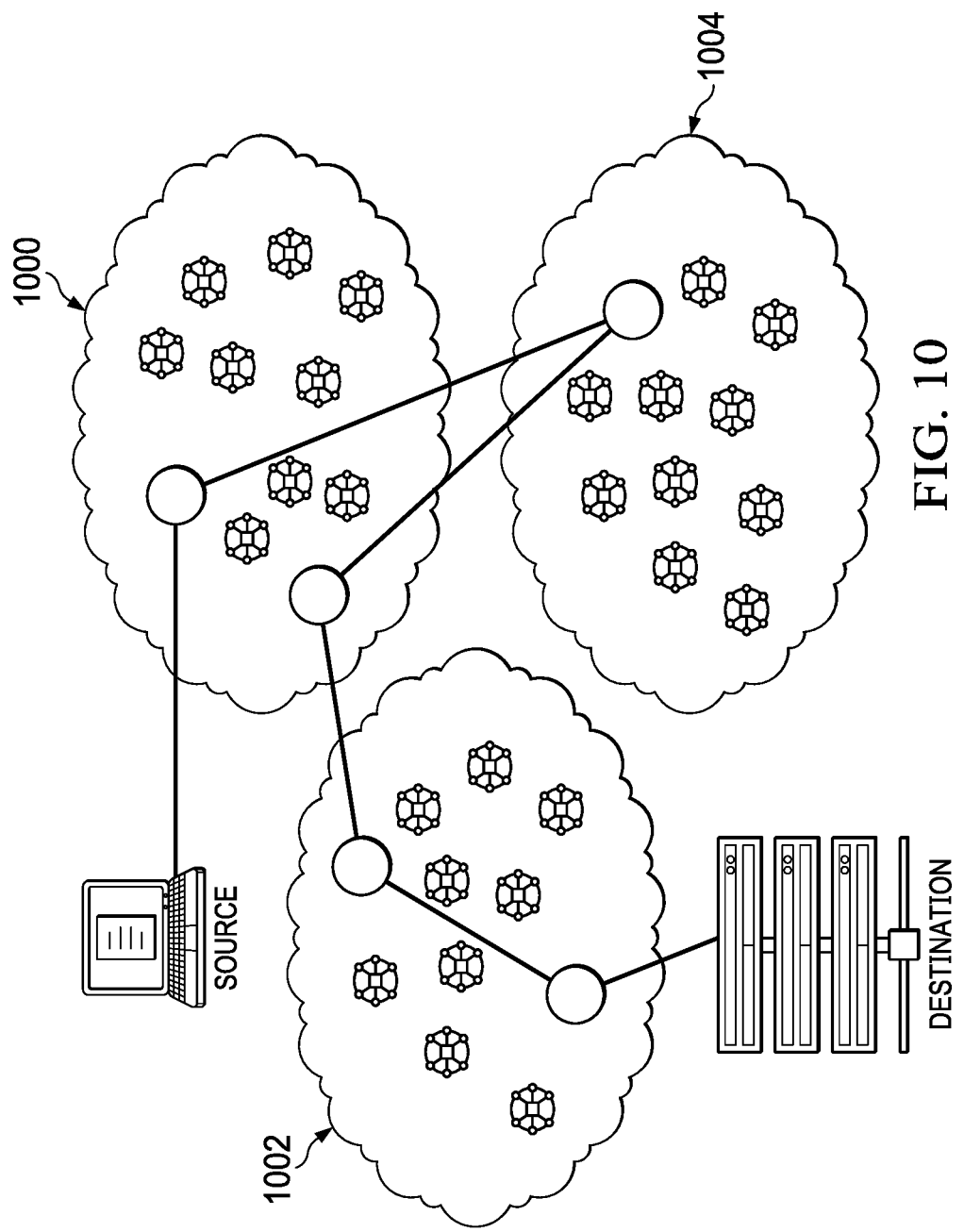
FIG. 10 depicts a distributed and loosely-coupled mesh network comprising nodes in multiple different domains.

FIG. 10 depicts a generalized distributed and loosely-coupled mesh network that includes nodes from multiple different networks and/or operating domains, in this example, the mesh comprises nodes located in Microsoft® Azure® 1000, nodes located in Google® Cloud 1002, and nodes located in Amazon® AWS 1004. Of course, this is just a representative embodiment, but not intended to be limiting.

More generally, there are many possible deployment options for the above-described techniques. These include Network-As-A-Service (NaaS) (a hosted and managed service provided by a service provider), hybrid/bridged networks (e.g., wherein internal users operating on a managed, secure network receive defense "in depth," and within fully-managed secure networks (e.g., on premise). Further, the technologies described may be implemented/integrated in various ways, e.g., a software-based solution or as a portable router device, via an SDK/API integration (e.g., for IoT, sensors, and standalone networked hardware), as a secure messaging and voice mobile device-based application (app), combinations of the above, and many others.

Typically, a "client" as used herein refers to a computing machine associated with the named person (e.g., Alice, or Bob). It is not necessarily required that a client be associated with a human being. A client may be an autonomous entity, such as an IoT endpoint or device.

It is not required that a particular virtual circuit have at least three (3) nodes.

While a node typically is associated with a single computing machine, this is not a requirement either. More than one node may be co-located on a particular machine.

A machine as used herein may be a physical machine or a virtual machine.

The peer-to-peer communication techniques described above may also be used to facilitate a 1-to-many communication among two or more clients.

Enabling Technologies

One or more functions of the computing platform of this disclosure may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Typically, but without limitation, a client device is a mobile device, such as a smartphone, tablet, or wearable computing device. Such a device comprises a CPU (central processing unit), computer memory, such as RAM, and a drive. The device software includes an operating system (e.g., Google® Android™, or the like), and generic support applications and utilities. The device may also include a graphics processing unit (GPU). The mobile device also includes a touch-sensing device or interface configured to receive input from a user's touch and to send this information to the processor. The touch-sensing device typically is a touch screen. The mobile device comprises suitable programming to facilitate gesture-based control, in a manner that is known in the art.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multimedia message (MMS), email, WAP, paging, or other known or later-developed wireless data formats. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

The underlying network transport may be any communication medium including, without limitation, cellular, wireless, Wi-Fi, small cell (e.g., Femto), and combinations thereof.

The techniques and technologies described herein may be implemented in association with a cross-platform SDK for customized development on connected devices including Android, iOS, Windows, Mac, Linux and ioT.

When the techniques herein are implemented in a mobile device client, preferably the mobile device executes a trusted execution environment (TEE) having a trusted user interface that runs entirely within the TEE. Screen and keyboard input (to the trusted UI) is then isolated from the apps that use the primary device operating system (OS). In such an arrangement typically the primary OS and TEE have independent CPUs, memory and storage, and communications to and from the TEE is done via communications channels. In this example, the application (mobile device app) that implements the techniques of this disclosure (e.g., DHT interaction, virtual circuit building, secure communications, etc.) utilizes tamper-resistant, hardware-level encryption and non-clonable key generation from the TEE.

An endpoint that implements the techniques of this disclosure may operate without the use of personally identifiable information (PII). Depending on implementation, a device provisioned with the above-described PSP technologies may interoperate with distributed and decentralized (e.g., blockchain) technologies to provide messaging with robust privacy control.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

The functionality may be implemented with other application layer protocols besides HTTP/HTTPS, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

Each above-described process preferably is implemented in computer software as a set of program instructions executable in one or more processors, as a special-purpose machine.

The techniques herein generally provide for the above-described improvements to a technology or technical field, as well as the specific technological improvements to various fields including secure communications and networking, all as described above.

What is claimed is as follows:

1. A method of secure communication operative at a first endpoint in association with a network of nodes configured as a mesh, wherein a node is a computing entity, comprising:
providing a distributed data structure across at least some of the nodes in the network, the distributed data structure storing presence records associated with endpoints, wherein a presence record does not reveal an identity of a user or service associated therewith;
establishing a secure communication between the first endpoint and a second endpoint by:
establishing a first virtual circuit and requesting a second endpoint presence record;
establishing a second virtual circuit to a rendezvous service instance located at a rendezvous node, wherein the first and second virtual circuits are established concurrently;
in response to receipt of the second endpoint presence record, directing a connection request to a second endpoint presence node identified in the second endpoint presence record, the connection request identifying the rendezvous node; and
securely communicating with the second endpoint over a bidirectional communications channel via the second virtual circuit and the rendezvous node, the second endpoint having accepted the connection request and established a separate virtual circuit to the rendezvous service instance.

2. The method as described in claim 1 wherein the distributed data structure is a distributed hash table (DHT).

3. The method as described in claim 1 further including applying multiple layers of encryption to the connection request.

4. The method as described in claim 3 wherein the multiple layers include at least three (3) layers, and wherein each virtual circuit has at least three (3) node hops.

5. The method as described in claim 4 wherein nodes in the network of nodes are capable of decrypting only one encryption layer of the multiple layers such that, in a set of three nodes comprising first, second and third nodes, the second node only sees the first and third nodes but not the first endpoint or the second endpoint.

6. The method as described in claim 1 wherein a given presence record includes an identifier of a node at which the given presence record is entered into the distributed data structure.

7. The method as described in claim 1 wherein the first endpoint and the second endpoint are computing devices associated with respective first and second users desiring to communicate with one another anonymously.

8. The method as described in claim 1 wherein the first endpoint is a computing device associated with a service, and the second endpoint is a computing device associated with a user desiring to communicate with the service anonymously.

9. The method as described in claim 1 wherein the first endpoint is a computing device associated with a user, and the second endpoint is a gateway associated with a secure networking environment.

10. The method as described in claim 1 wherein securely communicating comprises one of: messaging, chat, and video stream delivery.

11. The method as described in claim 1 wherein the mesh network includes nodes in multiple network domains.

12. The method as described in claim 1 wherein the mesh network includes nodes in multiple clouds.

13. The method as described in claim 1 wherein the mesh network at least in part comprises a given administrative domain on a managed network.

14. The method as described in claim 1 wherein, at a given node, a distributed data structure is stored only in-memory.

15. The method as described in claim 1 wherein the first endpoint is a mobile device executing a trusted execution environment.

16. The method as described in claim 1 wherein nodes comprising a virtual circuit are selected randomly.

17. The method as described in claim 1 wherein access to the bidirectional communication channel does not reveal a location of either the first or second endpoint.

18. The method as described in claim 1 further including:
directing a registration request to a registration service; and
receiving a certificate from the registration service authorizing the first endpoint to securely communicate with one or more other endpoints.

* * * * *